(12) United States Patent
Shibai et al.

(10) Patent No.: US 10,926,510 B2
(45) Date of Patent: *Feb. 23, 2021

(54) ANTIFOULING FILM

(71) Applicant: Sharp Kabushiki Kaisha, Sakai (JP)

(72) Inventors: Yasuhiro Shibai, Sakai (JP); Ken Atsumo, Sakai (JP); Kenichiro Nakamatsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/475,420

(22) PCT Filed: Jan. 11, 2018

(86) PCT No.: PCT/JP2018/000397
§ 371 (c)(1),
(2) Date: Jul. 2, 2019

(87) PCT Pub. No.: WO2018/135358
PCT Pub. Date: Jul. 26, 2018

(65) Prior Publication Data
US 2019/0329521 A1 Oct. 31, 2019

(30) Foreign Application Priority Data
Jan. 18, 2017 (JP) .............................. JP2017-006696

(51) Int. Cl.
*B32B 3/30* (2006.01)
*B32B 27/30* (2006.01)
(Continued)

(52) U.S. Cl.
CPC .............. *B32B 3/30* (2013.01); *B32B 27/308* (2013.01); *G02B 1/118* (2013.01); *G02B 1/18* (2015.01);
(Continued)

(58) Field of Classification Search
CPC ......... B32B 3/30; B32B 27/308; G02B 1/118; G02B 1/18
(Continued)

(56) References Cited

U.S. PATENT DOCUMENTS

2012/0007273 A1* 1/2012 Hubbard ................ C25D 11/24
264/219
2013/0004718 A1 1/2013 Takihara et al.
(Continued)

FOREIGN PATENT DOCUMENTS

JP  2013-018910 A  1/2013
JP  2013-039711 A  2/2013
(Continued)

OTHER PUBLICATIONS

Shibai et al., "Decorative Film", U.S. Appl. No. 16/488,257, filed Aug. 23, 2019.

*Primary Examiner* — Tahseen Khan
(74) *Attorney, Agent, or Firm* — Keating & Bennett, LLP

(57) ABSTRACT

The present invention provides an antifouling film that is excellent in antifouling properties, adhesion, rubbing resistance, and reliability, and reduces fingerprint emergence at high humidity. The antifouling film includes a substrate; and a polymer layer disposed on a surface of the substrate and including on a surface thereof an uneven structure provided with projections at a pitch not longer than a wavelength of visible light, the polymer layer being a cured product of a polymerizable composition, the polymerizable composition containing, in terms of active components, 20 to 90 wt % of a polyfunctional acrylate containing an ethylene oxide group, 5 to 25 wt % of a monofunctional amide monomer, and 0.5 to 10 wt % of a fluorine-based release agent, the polymerizable composition containing, in terms of active components, a total of 40 to 65 wt % of the ethylene oxide (Continued)

group in the polyfunctional acrylate and the monofunctional amide monomer.

8 Claims, 2 Drawing Sheets

(51) Int. Cl.
  *G02B 1/118* (2015.01)
  *G02B 1/18* (2015.01)
(52) U.S. Cl.
  CPC ....... *B32B 2250/02* (2013.01); *B32B 2307/40* (2013.01); *B32B 2307/538* (2013.01); *B32B 2307/554* (2013.01); *B32B 2310/08* (2013.01)
(58) Field of Classification Search
  USPC ........................................................ 428/141
  See application file for complete search history.

(56) References Cited

U.S. PATENT DOCUMENTS

| 2014/0077418 | A1* | 3/2014 | Otani | B29C 59/046 |
| | | | | 264/447 |
| 2015/0166704 | A1 | 6/2015 | Otani et al. | |
| 2016/0054478 | A1* | 2/2016 | Otani | G02B 1/118 |
| | | | | 428/141 |
| 2016/0229095 | A1* | 8/2016 | Mori | G02B 1/118 |
| 2017/0066207 | A1 | 3/2017 | Hayashi et al. | |
| 2017/0320281 | A1 | 11/2017 | Hayashi et al. | |
| 2018/0105645 | A1* | 4/2018 | Takano | B01J 23/44 |

FOREIGN PATENT DOCUMENTS

| JP | 2013-252689 | A | | 12/2013 | | |
| JP | 5573836 | B2 | | 8/2014 | | |
| JP | 2015-129947 | A | | 7/2015 | | |
| JP | 5951165 | B1 | | 7/2016 | | |
| WO | WO-2016159302 | A1 | * | 10/2016 | ............ | C07B 31/00 |

\* cited by examiner (a)

(b)

(c)

(d)

ANTIFOULING FILM

TECHNICAL FIELD

The present invention relates to antifouling films. The present invention more specifically relates to an antifouling film including an uneven structure of nanometer scale.

BACKGROUND ART

Various optical films having antireflective properties have been studied (e.g., Patent Literatures 1 to 6). In particular, optical films having an uneven structure of nanometer scale (nanostructure) are known for their excellent antireflective properties. This uneven structure has a continuously varying refractive index from the air layer to the substrate, thereby capable of reducing the reflected light significantly.

CITATION LIST

Patent Literature

Patent Literature 1: JP 2015-129947 A
Patent Literature 2: JP 2013-18910 A
Patent Literature 3: JP 2013-39711 A
Patent Literature 4: JP 2013-252689 A
Patent Literature 5: JP 5573836 B
Patent Literature 6: JP 5951165 B

SUMMARY OF INVENTION

Technical Problem

Although such optical films have excellent antireflective properties, the uneven structure on the surface may cause easy spread of dirt such as fingerprints (sebaceous dirt) sticking thereon and further cause difficulty in wiping off such dirt present between projections. Such sticking dirt has a reflectance that is very different from the reflectance of the optical film, and thus is noticeable. This has increased the demand for functional films (antifouling films) including on their surface an uneven structure of nanometer scale and showing excellent ease of wiping off dirt (e.g., ease of wiping off fingerprints), i.e., excellent antifouling properties.

The present inventors made studies on such films, and found that an antifouling film increased in antifouling properties and other various properties can be achieved by devising the materials of the polymer layer constituting the uneven structure of the optical film. Specifically, using a fluorine-based release agent as a material of the polymer layer was found to increase the antifouling properties, and adjusting the amount of the agent used was found to prevent bleed-out in high-temperature/high-humidity environments and increase the reliability. Also, using a monofunctional amide monomer as a material of the polymer layer was found to increase the adhesion between the polymer layer and the substrate of the antifouling film. Using a polyfunctional acrylate containing an ethylene oxide group as a material of the polymer layer was found to increase the rubbing resistance.

The present inventors made further studies on the films. The studies found that leaving an antifouling film, from which fingerprints on the surface of its polymer layer (uneven structure) have been wiped off, at high humidity causes the residual fingerprints to come up and emerge again. Especially when a fluorine-based release agent is used as a material of the polymer layer, the sticking fingerprints are not likely to spread, so that the residual fingerprints emerged clearly.

As described above, the conventional antifouling films fail to reduce fingerprint emergence at high humidity while increasing the antifouling properties, adhesion, rubbing resistance, and reliability. However, any way to deal with the failure was not found. For example, Patent Literatures 1 to 6 do not disclose any statements relating to fingerprint emergence at high humidity, and can therefore be improved in this respect.

In response to the above issues, an object of the present invention is to provide an antifouling film that is excellent in antifouling properties, adhesion, rubbing resistance, and reliability, and reduces fingerprint emergence at high humidity.

Solution to Problem

The present inventors made various studies on an antifouling film that is excellent in antifouling properties, adhesion, rubbing resistance, and reliability, and reduces fingerprint emergence at high humidity. The inventors then found use of a polyfunctional acrylate containing an ethylene oxide group, a monofunctional amide monomer, and a fluorine-based release agent at a predetermined ratio as the materials of the polymer layer, and setting of the total amount of the ethylene oxide group in the polyfunctional acrylate and the monofunctional amide monomer to a value in a predetermined range. Thereby, the inventors successfully achieved the above object, arriving at the present invention.

In other words, one aspect of the present invention may be an antifouling film including: a substrate; and a polymer layer disposed on a surface of the substrate and including on a surface thereof an uneven structure provided with projections at a pitch not longer than a wavelength of visible light, the polymer layer being a cured product of a polymerizable composition, the polymerizable composition containing, in terms of active components, 20 to 90 wt % of a polyfunctional acrylate containing an ethylene oxide group, 5 to 25 wt % of a monofunctional amide monomer, and 0.5 to 10 wt % of a fluorine-based release agent, the polymerizable composition containing, in terms of active components, a total of 40 to 65 wt % of the ethylene oxide group in the polyfunctional acrylate and the monofunctional amide monomer.

The polyfunctional acrylate may include a bifunctional first polyfunctional acrylate containing two to seven ethylene oxide groups per functional group and a tri- to hexafunctional second polyfunctional acrylate containing one to two ethylene oxide groups per functional group, and the polymerizable composition may contain, in terms of active components, 20 to 65 wt % of the first polyfunctional acrylate and 10 to 70 wt % of the second polyfunctional acrylate.

The monofunctional amide monomer may contain N,N-dimethylacrylamide.

The fluorine-based release agent may contain a perfluoropolyether group.

The polymer layer may have a surface that shows a contact angle of 60° or greater with hexadecane.

The polymer layer may have a thickness of 5.0 μm or greater and 20.0 μm or smaller.

The projections may be formed at an average pitch of 100 nm or longer and 400 nm or shorter.

The projections may have an average height of 50 nm or greater and 600 nm or smaller.

The projections may have an average aspect ratio of 0.8 or greater and 1.5 or smaller.

Advantageous Effects of Invention

The present invention can provide an antifouling film that is excellent in antifouling properties, adhesion, rubbing resistance, and reliability, and reduces fingerprint emergence at high humidity.

DESCRIPTION OF EMBODIMENTS

The present invention is described in more detail based on the following embodiment with reference to the drawings. The embodiment, however, is not intended to limit the scope of the present invention. The configurations of the embodiment may appropriately be combined or modified within the spirit of the present invention.

The expression "X to Y" as used herein means "X or more and Y or less".

Embodiment

Figure 1:
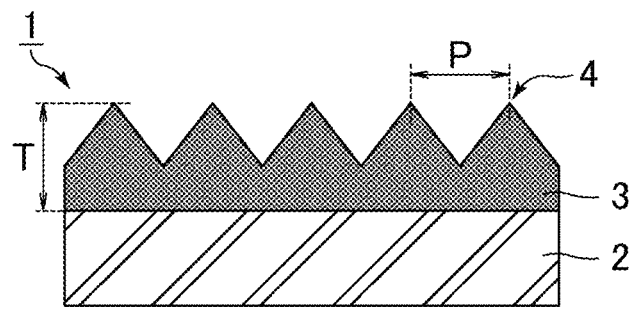
FIG. 1 is a schematic cross-sectional view of an antifouling film of an embodiment.
Figure 2:
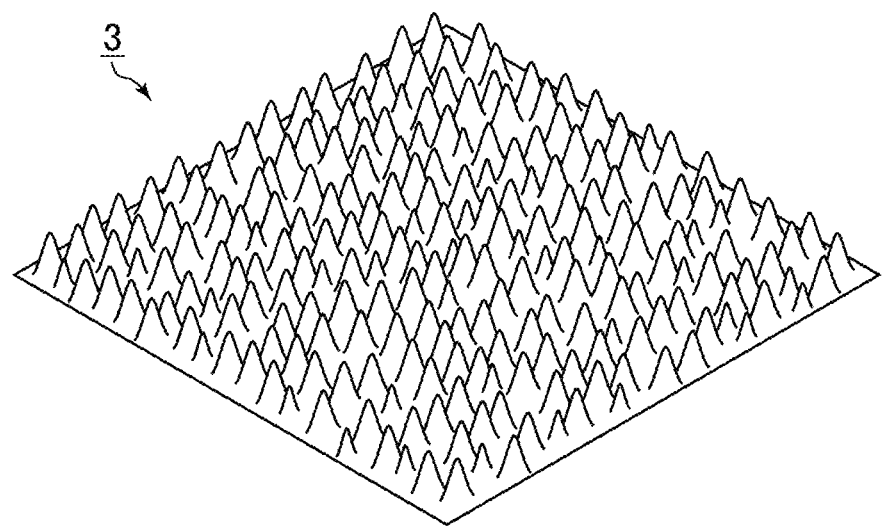
FIG. 2 is a schematic plan view of a polymer layer in FIG. 1.

An antifouling film of an embodiment is described below with reference to FIG. 1 and FIG. 2. FIG. 1 is a schematic cross-sectional view of the antifouling film of the embodiment. FIG. 2 is a schematic plan view of a polymer layer in FIG. 1.

An antifouling film 1 includes a substrate 2 and a polymer layer 3 disposed on a surface of the substrate 2.

The material of the substrate 2 may be, for example, a resin such as triacetyl cellulose (TAC), polyethylene terephthalate (PET), or methyl methacrylate (MMA). The substrate 2 may appropriately further contain an additive such as a plasticizer in addition to the above material. One surface (the surface close to the polymer layer 3) of the substrate 2 may have undergone easy adhesion treatment. For example, a triacetyl cellulose film with easy adhesion treatment may be used. One surface (the surface close to the polymer layer 3) of the substrate 2 may have undergone saponification treatment. For example, a saponified triacetyl cellulose film may be used. When the antifouling film 1 is attached to a display device provided with a polarizing plate such as a liquid crystal display device, the substrate 2 may be part of the polarizing plate.

The substrate 2 preferably has a thickness of 50 μm or greater and 100 μm or smaller in order to ensure the transparency and processability.

The polymer layer 3 includes on a surface thereof an uneven structure on which multiple projections (protrusions) 4 are disposed with a pitch (distance between the apexes of adjacent projections 4) P not longer than the wavelength (780 nm) of visible light, i.e., a moth-eye structure (a structure like a moth's eye). Thus, an antifouling film 1 can exert excellent antireflective properties (low reflectivity) owing to the moth-eye structure.

The polymer layer 3 preferably has a small thickness T for distribution of fluorine atoms in the later-described fluorine-based release agent at a high concentration on the surface (the surface remote from the substrate 2) of the polymer layer 3. Specifically, the polymer layer 3 has a thickness T of 5.0 μm or greater and 20.0 μm or smaller, more preferably 8.0 μm or greater and 12.0 μm or smaller. The thickness T of the polymer layer 3 indicates, as shown in FIG. 1, the distance from the surface close to the substrate 2 to the apex of a projection 4.

Examples of the shape of the projections 4 include those tapering toward the tip (tapered shapes) such as shapes consisting of a columnar lower part and a hemispherical upper part (temple-bell-like shapes) and conical shapes (cone-like shapes, circular-cone-like shapes). In FIG. 1, the bases of the gaps between any adjacent projections 4 are inclined, but the bases may not be inclined but may be flat.

The projections 4 are preferably formed at an average pitch of 100 nm or longer and 400 nm or shorter, more preferably 100 nm or longer and 200 nm or shorter, for sufficient prevention of optical phenomena such as moiré and iridescence. The average pitch of the projections 4 specifically means the average pitch of all the adjacent projections within a 1-μm-square region in a plan image taken by a scanning electron microscope.

The projections 4 preferably have an average height of 50 nm or greater and 600 nm or smaller, more preferably 100 nm or greater and 300 nm or smaller, for simultaneous achievement of the preferred average height and the later-described preferred average aspect ratio of the projections 4. The average height of the projections 4 specifically means the average value of the heights of 10 consecutive projections in a cross-sectional image taken by a scanning electron microscope. These 10 projections were selected so as not to include projections having any defect or deformed portion (e.g., a portion accidentally deformed during preparation of a measurement sample).

The projections 4 preferably have an average aspect ratio of 0.8 or greater and 1.5 or smaller, more preferably 1.0 or greater and 1.3 or smaller. If the average aspect ratio of the projections 4 is smaller than 0.8, the film may insufficiently prevent occurrence of optical phenomena such as moiré and iridescence, possibly failing to achieve good antireflective properties. If the average aspect ratio of the projections 4 is greater than 1.5, the processability of the uneven structure may be poor, sticking may occur, and transferring conditions in formation of the uneven structure may be poor (e.g., clogging of the die 6, twining of the material). The average aspect ratio of the projections 4 as used herein means the ratio of the average height of the projections 4 and the average pitch of the projections 4 (height/pitch).

The projections 4 may be arranged either randomly or regularly (periodically). The projections 4 may be arranged with periodicity. Yet, in terms of advantages such as no generation of diffracted light due to the periodicity, the projections 4 are preferably arranged with no periodicity (arranged randomly) as shown in FIG. 2.

The polymer layer 3 is a cured product of a polymerizable composition. Examples of the polymer layer 3 include a cured product of active energy ray-curable polymerizable composition and a cured product of a thermosetting polymerizable composition. The active energy rays mean ultraviolet rays, visible light, infrared rays, or plasma, for example. The polymer layer 3 is preferably a cured product of an active energy ray-curable polymerizable composition, more preferably a cured product of an ultraviolet ray-curable polymerizable composition.

The polymerizable composition contains, in terms of active components, 20 to 90 wt % of a polyfunctional acrylate containing an ethylene oxide group (hereinafter, also referred to as Component A), 5 to 25 wt % of a monofunctional amide monomer (hereinafter, also referred to as Component B), and 0.5 to 10 wt % of a fluorine-based release agent (hereinafter, also referred to as Component C), a total of 40 to 65 wt % of the ethylene oxide group in the polyfunctional acrylate (Component A) and the monofunctional amide monomer (Component B).

The active components (active components of Components A to C) of the polymerizable composition refer to those constituting the polymer layer 3 after curing, excluding those not contributing to the curing reaction (polymerization reaction) (e.g., solvent). For example, the active component of Component C refers to a compound containing a fluorine atom in a molecule.

The polymerizable composition, containing the above proportions of Components A to C, may also contain other component(s).

Components A to C are described below.

<Component A>

Component A increases the crosslinking density of the polymer layer 3 and provides an appropriate hardness (elasticity) to the polymer layer 3, increasing the rubbing resistance. Also, the high polarity of the ethylene oxide group increases the interaction between the polymer layer 3 and the substrate 2, increasing the adhesion. The rubbing resistance is considered to correlate with the crosslinking density and glass transition temperature of the polymer layer 3. Increasing the crosslinking density and decreasing the glass transition temperature therefore can significantly increase the rubbing resistance. For example, a polymerizable composition containing a polyfunctional acrylate containing a propylene oxide group unfortunately has a higher glass transition temperature than a polymerizable composition containing a polyfunctional acrylate containing an ethylene oxide group. This is because the branched —$CH_3$ in the propylene oxide group restricts the molecular motion. Also, propylene oxide groups (and hydrocarbon groups) have lower polarity than ethylene oxide groups, and thus decrease the interaction between the polymer layer 3 and the substrate 2, which decreases the adhesion. Hence, the present embodiment utilizes an ethylene oxide group from the viewpoints of rubbing resistance and adhesion. A polyfunctional acrylate refers to an acrylate containing two or more acryloyl groups per molecule.

The polymerizable composition has a Component A content, in terms of active components, of 20 to 90 wt %, preferably 25 to 85 wt %, more preferably 30 to 80 wt %. When the Component A content in terms of active components is lower than 20 wt %, the polymer layer 3 has insufficient elasticity (high glass transition temperature) and thus decreases the rubbing resistance. When the Component A content in terms of active components is higher than 90 wt %, the polymer layer 3 has significantly low crosslinking density and thus decreases the rubbing resistance. In the case where the polymerizable composition contains a plurality of Components A, the total of the Component A contents in terms of active components should fall within the above range.

Component A preferably includes a bifunctional first polyfunctional acrylate containing two to seven ethylene oxide groups per functional group and a tri- to hexa-functional second polyfunctional acrylate containing one to two ethylene oxide groups per functional group. The polymerizable composition preferably contains, in terms of active components, 20 to 65 wt % of the first polyfunctional acrylate and 10 to 70 wt % of the second polyfunctional acrylate. When the first polyfunctional acrylate and the second polyfunctional acrylate are used in combination as Components A, the adhesion and the rubbing resistance are further increased, so that fingerprint emergence at high humidity is further reduced. The number of functional groups of the polyfunctional acrylate refers to the number of acryloyl groups per molecule. Also, the number of ethylene oxide groups per functional group refers to the ratio (number of ethylene oxide groups per molecule)/(number of acryloyl groups per molecule).

If the first polyfunctional acrylate content in terms of active components is lower than 20 wt %, the cure shrinkage of the polymerizable composition may not be reduced, and thus the adhesion may be decreased. If the first polyfunctional acrylate content in terms of active components is higher than 65 wt %, the crosslinking density of the polymer layer 3 may not be increased and thus the hardness may be significantly low, so that the rubbing resistance may not be easily increased. The polymerizable composition more preferably has, in terms of active components, a first polyfunctional acrylate content of 25 to 55 wt %, still more preferably 30 to 45 wt %.

If the second polyfunctional acrylate content in terms of active components is lower than 10 wt %, the crosslinking density of the polymer layer 3 may not be increased and thus the hardness may be significantly low, so that the rubbing resistance may not be easily increased. If the second polyfunctional acrylate content in terms of active components is higher than 70 wt %, the cure shrinkage of the polymerizable composition may not be reduced, and thus the adhesion may be decreased. Also, the crosslinking density of the polymer layer 3 may be significantly low (the glass transition temperature may be significantly high), so that the rubbing resistance may not be easily increased. The polymerizable composition more preferably has, in terms of active components, a second polyfunctional acrylate content of 15 to 65 wt %, still more preferably 20 to 60 wt %.

If the number of ethylene oxide groups in each of the first polyfunctional acrylate and the second polyfunctional acrylate is significantly small, the polymer layer 3 may have insufficient elasticity, and thus the rubbing resistance may not be easily increased. If the number of ethylene oxide groups is significantly large, the molecular weight between crosslinks may increase and thus the hygroscopicity may be significantly high, so that the fingerprint emergence at high humidity may not be easily reduced.

Examples of Component A include polyethylene glycol diacrylate, ethoxylated pentaerythritol tetraacrylate, ethoxylated pentaerythritol triacrylate, ethoxylated glycerol triacrylate, and alkoxylated dipentaerythritol polyacrylate. Known examples of the polyethylene glycol diacrylate include "NK Ester A-200" (the number of functional groups: 2, the number of ethylene oxide groups: 2 per functional group, proportion by weight of ethylene oxide groups: 0.57), "NK Ester A-400" (the number of functional groups: 2, the number of ethylene oxide groups: 4.5 per functional group, proportion by weight of ethylene oxide groups: 0.78), and "NK Ester A-600" (the number of functional groups: 2, the number of ethylene oxide groups: 7 per functional group, proportion by weight of ethylene oxide groups: 0.87), all from Shin Nakamura Chemical Co., Ltd. Known examples of the ethoxylated pentaerythritol tetraacrylate include "NK Ester ATM-35E" (the number of functional groups: 4, the number of ethylene oxide groups: 8.75 per functional group, proportion by weight of ethylene oxide groups: 0.81) and "NK Ester ATM-4E" (the number of functional groups: 4, the number of ethylene oxide groups: 1 per functional group, proportion by weight of ethylene oxide groups: 0.33), both from Shin Nakamura Chemical Co., Ltd. Known examples of the ethoxylated pentaerythritol triacrylate include "NK Ester A-TMPT-3EO" (the number of functional groups: 3, the number of ethylene oxide groups: 1 per functional group, proportion by weight of ethylene oxide groups: 0.31) from Shin Nakamura Chemical Co., Ltd. Known examples of the ethoxylated glycerol triacrylate include "NK Ester A-GLY-3E" (the number of functional groups: 3, the number of ethylene oxide groups: 1 per functional group, proportion by weight of ethylene oxide groups: 0.34) from Shin Nakamura Chemical Co., Ltd. Known examples of the alkoxylated dipentaerythritol polyacrylate include "KAYARAD® DPEA-12" (the number of functional groups: 6, the number of ethylene oxide groups: 2 per functional group, proportion by weight of ethylene oxide groups: 0.48) from Nippon Kayaku Co., Ltd.

<Component B>

Component B increases the compatibility between Components A and C, increasing the rubbing resistance. Also, Component B reduces cure shrinkage of the polymerizable composition and increases the cohesive force between the polymer layer 3 and the substrate 2, increasing the adhesion between them. Component C may have a long-chain structure, and therefore may have low compatibility with Component A. Thus, Component B not only increases the cohesive force between the polymer layer 3 and the substrate 2 but also functions as a reactive diluent (compatibilizer) for Components A and C. The monofunctional amide monomer refers to an acrylate that contains an amide group and contains one acryloyl group per molecule.

The polymerizable composition has a Component B content, in terms of active components, of 5 to 25 wt %, preferably 7.5 to 20 wt %, more preferably 10 to 15 wt %. In other words, an amide group content of Component B is 0.5 to 2.5 mmol/g, preferably 0.75 to 2.0 mmol/g, more preferably 1.0 to 1.5 mmol/g in the polymerizable composition. When the Component B content in terms of active components is lower than 5 wt %, the smoothness is decreased, so that the rubbing resistance is decreased. Also, the cure shrinkage of the polymerizable composition is not reduced, and thus the adhesion is decreased. When the Component B content in terms of active components is higher than 25 wt %, the polymer layer 3 has significantly low crosslinking density (significantly high glass transition temperature) and thus decreases the rubbing resistance. In the case where the polymerizable composition contains a plurality of Components B, the total of the Component B contents in terms of active components should fall within the above range.

Examples of Component B include N,N-dimethylacrylamide, N-acryloylmorpholine, N,N-diethylacrylamide, N-(2-hydroxyethyl)acrylamide, diacetone acrylamide, and N-n-butoxymethylacrylamide. Known examples of N,N-dimethylacrylamide include "DMAA®" from KJ Chemicals Corp. Known examples of N-acryloylmorpholine include "ACMO®" from KJ Chemicals Corp. Known examples of N,N-diethylacrylamide include "DEAR®" from KJ Chemicals Corp. Known examples of N-(2-hydroxyethyl)acrylamide include "HEAR®" from KJ Chemicals Corp. Known examples of diacetone acrylamide include "DRAM®" from Nippon Kasei Chemical Co., Ltd. Known examples of N-n-butoxymethylacrylamide include "NBMA" from MCC Unitec Co., Ltd.

Component B preferably includes N,N-dimethylacrylamide. Component B including N,N-dimethylacrylamide has low viscosity and further increases the compatibility between Components A and C. Also, such Component B increases the adhesion even when the substrate 2 is a triacetyl cellulose film.

<Component C>

Component C distributes fluorine atoms on the surface (the surface remote from the substrate 2) of the polymer layer 3 to lower the surface free energy of the polymer layer 3, increasing the antifouling properties. Component C also increases the smoothness, and thereby increases the rubbing resistance. The fluorine-based release agent refers to one containing, as an active component, a compound containing a fluorine atom in a molecule.

The polymerizable composition has a Component C content, in terms of active components, of 0.5 to 10 wt %, preferably 1 to 5 wt %, more preferably 1.5 to 3 wt %. When the Component C content in terms of active components is lower than 0.5 wt %, the amount of fluorine atoms distributed on the surface (the surface remote from the substrate 2) of the polymer layer 3 is significantly small, and thus the antifouling properties are deteriorated. Also, the smoothness is decreased, so that the rubbing resistance is decreased. When the Component C content in terms of active components is higher than 10 wt %, the compatibility between Components A and B is significantly low, and thus fluorine atoms are not uniformly distributed on the surface (the surface remote from the substrate 2) of the polymer layer 3, so that the antifouling properties and the rubbing resistance are decreased. Also, bleed-out is likely to occur in a high temperature/high humidity environment, so that the optical properties (reliability) are deteriorated. In the case where the polymerizable composition contains a plurality of Components C, the total of the Component C contents in terms of active components should fall within the above range.

Component C may contain a perfluoropolyether group or a perfluoroalkyl group, but preferably contains a perfluoropolyether group. A release agent containing a perfluoropolyether group has better antifouling properties and rubbing resistance than a release agent containing no perfluoropolyether group (e.g., release agent containing a perfluoroalkyl group, silicone-based release agent).

Known examples of Component C include "Fomblin® MT70" and "Fomblin AD1700" from Solvay, and "Optool® DAC" and "Optool DAC-HP" from Daikin Industries, Ltd.

The polymerizable composition contains, in terms of active components, a total of 40 to 65 wt %, preferably 45 to 60 wt %, more preferably 50 to 55 wt %, of the ethylene oxide group of Component A and Component B. In the case where the total of the ethylene oxide group content of Component A and the Component B content in terms of active components is lower than 40 wt %, the adhesion or the rubbing resistance decreases. In the case where the total of the ethylene oxide group content of Component A and the Component B content in terms of active components is higher than 65 wt %, the hygroscopicity increases significantly, so that the fingerprint emergence at high humidity is not reduced.

The present inventors believe that the fingerprint emergence at high humidity occurs through the following mechanism. When an attempt is made to wipe off fingerprints on the surface (the surface remote from the substrate 2) of the polymer layer 3, a fingerprint adhering near a projection 4 can be wiped off, but a fingerprint present between adjacent projections 4 and a fingerprint permeated into the polymer layer 3 cannot be wiped off and remain there. Leaving the antifouling film 1 in this state at high humidity increases the difference in refractive index between the portion without a fingerprint residue and the portion with a fingerprint residue due to the different hygroscopicities thereof, which causes the fingerprint residue to emerge again. Here, both the ethylene oxide group of Component A and the amide group of Component B have high polarity, and therefore have high hygroscopicity. Hence, when the polymerizable composition constituting the polymer layer 3 contains Component A and Component B, fingerprint emergence at high humidity is noticeable. The present embodiment therefore sets the total of the ethylene oxide group content of Component A and the Component B content to a value in a predetermined range, and thereby reduces fingerprint emergence at high humidity while increasing the antifouling properties, adhesion, and rubbing resistance.

The polymerizable composition may further contain a polymerization initiator. Thereby, the curability of the polymerizable composition increases.

Examples of the polymerization initiator include photopolymerization initiators and thermal polymerization initiators, with the photopolymerization initiators preferred. A photopolymerization initiator is active to active energy rays, and is added to initiate the polymerization reaction that polymerizes monomers.

Examples of the photopolymerization initiator include radical polymerization initiators, anionic polymerization initiators, and cationic polymerization initiators. Examples of such a photopolymerization initiator include acetophenones such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropylthioxanthone; benzoin ethers such as benzoin, benzoin methyl ether, benzoin isopropyl ether, and benzoin isobutyl ether; benzyl ketals such as benzyl dimethyl ketal and hydroxycyclohexyl phenyl ketone; acylphosphine oxides such as 2,4,6-trimethylbenzoyl-diphenyl-phosphine oxide and bis(2,4,6-trimethylbenzoyl)-phenylphosphine oxide; and alkylphenones such as 1-hydroxy-cyclohexyl-phenyl-ketone. Known examples of 2,4,6-trimethylbenzoyl-diphenyl-phosphine oxide include "LUCIRIN® TPO" and "IRGACURE® TPO" from IGM Resins. Known examples of bis(2,4,6-trimethylbenzoyl)-phenylphosphine oxide include "IRGACURE 819" from IGM Resins. Known examples of 1-hydroxy-cyclohexyl-phenyl-ketone include "IRGACURE 184" from IGM Resins.

The polymerizable composition may further contain a solvent (component other than active components). In this case, the solvent may be contained in Components A to C together with active components, or may be contained separately from Components A to C.

Examples of the solvent include alcohols (C1-C10 ones such as methanol, ethanol, n- or i-propanol, n-, sec-, or, t-butanol, benzyl alcohol, octanol), ketones (C3-C8 ones such as acetone, methyl ethyl ketone, methyl isobutyl ketone, diisobutyl ketone, dibutyl ketone, cyclohexane), esters or ether esters (C4-C10 ones such as ethyl acetate, butyl acetate, ethyl lactate), γ-butyrolactone, ethylene glycol monomethyl acetate, propylene glycol monomethyl acetate, ethers (C4-C10 ones such as EG monomethyl ether (methyl cellosolve), EG monomethyl ether (ethyl cellosolve), diethylene glycol monobutyl ether (butyl cellosolve), propylene glycol monomethyl ether), aromatic hydrocarbons (C6-C10 ones such as benzene, toluene, xylene), amides (C3-C10 ones such as dimethylformamide, dimethylacetamide, N-methylpyrrolidone), halogenated hydrocarbons (C1-C2 ones such as methylene dichloride, ethylene dichloride), and petroleum-based solvents (e.g., petroleum ether, petroleum naphtha).

In terms of the antifouling properties, the polymer layer 3 preferably has a surface (the surface remote from the substrate 2) that shows a contact angle of 60° or greater with hexadecane.

The antifouling film 1 may be used in any way that utilizes the excellent antifouling properties of the antifouling film 1, and may be used as, for example, an optical film such as an antireflective film. Such an antireflective film contributes to an increase in visibility when it is mounted inside or outside a display device.

The antifouling properties of the antifouling film 1 may mean that dirt adhering to the surface (the surface remote from the substrate 2) of the polymer layer 3 is easily removable, or that dirt is not likely to adhere to the surface (the surface remote from the substrate 2) of the polymer layer 3. The antifouling film 1, owing to its moth-eye structure, can achieve better antifouling properties than a conventional fluorine-containing film having a normal surface such as a flat surface.

Figure 3:
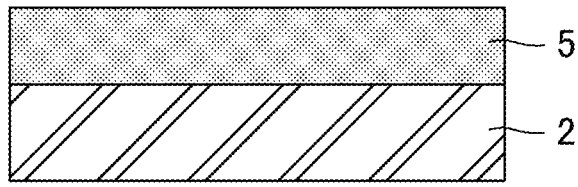
FIG. 3 is a schematic cross-sectional view illustrating an exemplary method for producing the antifouling film of the embodiment.
Figure 3:
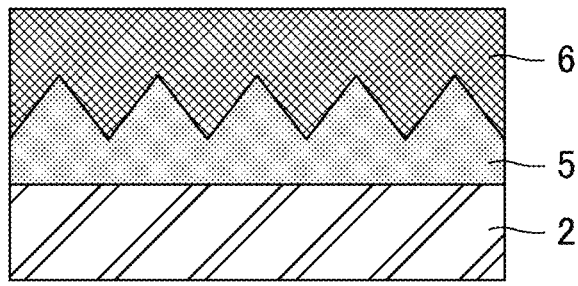
Figure 3:
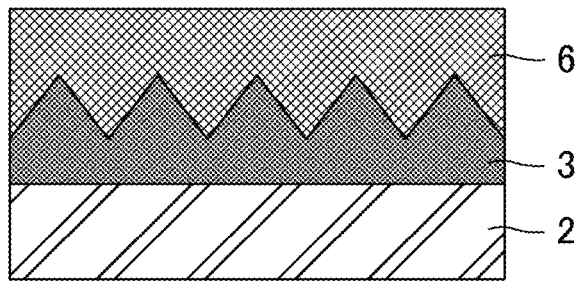
Figure 3:
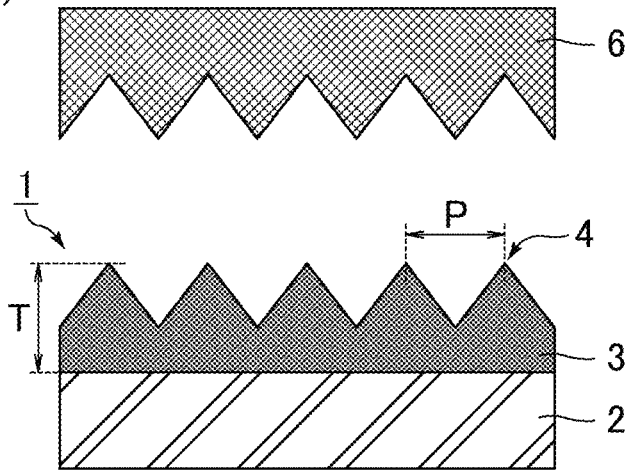

The antifouling film 1 can be produced by, for example, the following production method. FIG. 3 is a schematic cross-sectional view illustrating an exemplary method for producing the antifouling film of the embodiment.

(Process 1)

As shown in FIG. 3(*a*), a polymerizable composition 5 is applied to a surface of the substrate 2.

Examples of techniques of applying the polymerizable composition 5 include spray coating, gravure coating, slot-die coating, and bar coating. For application of the polymerizable composition 5, gravure coating or slot-die coating is preferred in order to level the thickness of the resulting film and to achieve good productivity.

The polymerizable composition 5 contains the above proportions of Components A to C. When the polymerizable composition 5 further contains a solvent (component other than active components), heating (drying) may be performed to remove the solvent after application of the polymerizable composition 5. The heating is preferably performed at a temperature equal to or higher than the boiling point of the solvent.

(Process 2)

As shown in FIG. 3(*b*), the substrate 2 is pushed to a die 6 with the polymerizable composition 5 in between. As a result, an uneven structure is formed on a surface (surface remote from the substrate 2) of the polymerizable composition 5.

(Process 3)

The polymerizable composition 5 having an uneven structure on the surface is cured. As a result, as shown in FIG. 3(*c*), the polymer layer 3 is formed.

Curing of the polymerizable composition 5 is achieved by, for example, application of active energy rays or heating, preferably by application of active energy rays, more preferably by application of ultraviolet rays. Application of active energy rays may be performed from the substrate 2 side of the polymerizable composition 5, or may be performed from the die 6 side of the polymerizable composition 5. Application of active energy rays may be performed once or may be performed multiple times. Curing of the polymerizable composition 5 (Process 3) may be performed simultaneously with the aforementioned formation of the uneven structure on the polymerizable composition 5 (Process 2).

(Process 4)

As shown in FIG. 3(d), the die 6 is released from the polymer layer 3. As a result, the antifouling film 1 is completed.

In the aforementioned exemplary production method, Processes 1 to 4 can be continuously and efficiently performed if the substrate 2 is in the form of a roll, for example.

In Processes 1 and 2, the present exemplary production method includes a process of applying the polymerizable composition 5 to the surface of the substrate 2 and then pushing the substrate 2 to the die 6 with the polymerizable composition 5 in between. Yet, the method may include a process of applying the polymerizable composition 5 to a surface of the die 6, and then pushing the substrate 2 to the die 6 with the polymerizable composition 5 in between.

The die 6 may be one produced by the following method. First, a film of aluminum that is a material of the die 6 is formed on a surface of a support by sputtering. Next, the resulting aluminum layer is repetitively subjected to anodizing and etching. Thereby, a cavity (die 6) of the moth-eye structure can be produced. At this time, the uneven structure of the die 6 can be modified by adjusting the duration of the anodizing and the duration of the etching.

Examples of a material of the support include glass; metals such as stainless steel and nickel; polyolefinic resins such as polypropylene, polymethylpentene, and cyclic olefinic polymers (typified by norbornene-based resin, e.g., "Zeonor®" from Zeon Corp., "Arton®" from JSR Corp.); polycarbonate resin; and resins such as polyethylene terephthalate, polyethylene naphthalate, and triacetyl cellulose. Instead of the support with an aluminum film formed on the surface, an aluminum support may be used.

The die 6 may have a shape of a flat plate or a roll, for example.

The surface of the die 6 preferably has undergone release treatment. Thereby, the die 6 can be easily removed from the polymer layer 3. Further, this treatment makes the surface free energy of the die 6 low, and thus the fluorine atoms in Component C can uniformly be distributed on the surface (the surface remote from the substrate 2) of the polymerizable composition 5 when the substrate 2 is pushed to the die 6 in Process 2. Further, this treatment can prevent early removal of the fluorine atoms in Component C from the surface (the surface remote from the substrate 2) of the polymerizable composition 5 before curing of the polymerizable composition 5. As a result, in the antifouling film 1, the fluorine atoms in Component C can uniformly be distributed on the surface (the surface remote from the substrate 2) of the polymer layer 3.

Examples of a material to be used for release treatment of the die 6 include fluorine-based materials, silicone-based materials, and phosphate-ester-based materials. Known examples of the fluorine-based materials include "Optool DSX" and "Optool AES4" from Daikin Industries, Ltd.

EXAMPLES AND COMPARATIVE EXAMPLES

The present invention is described in more detail based on the following examples and comparative examples. The examples, however, are not intended to limit the scope of the present invention.

The materials used in production of the antifouling films in the examples and comparative examples were as follows.
<Substrate>
"TAC-TD80U" from Fujifilm Corp. was used. The thickness thereof was 80 µm.

<Die>
A die produced by the following method was used. First, a film of aluminum that is a material of the die was formed on a 10-cm-square glass substrate by sputtering. The thickness of the resulting aluminum layer was 1.0 µm. Next, the resulting aluminum layer was repetitively subjected to anodizing and etching. Thereby, an anodized layer was formed with many fine pores (distance between the bottom points of adjacent pores (recesses) was not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum layer (a tapered shape). As a result, a die having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die was found to have a recess depth of 290 nm by scanning electron microscopic observation. The surface of the die was subjected to release treatment with "Optool AES4" from Daikin Industries, Ltd. in advance.

<Polymerizable Composition>
Polymerizable compositions R1 to R22 and r1 to r13 formed from the materials shown in Tables 1 to 8 were used. The values in Tables 1 to 8 are each the component content (unit: parts by weight) in the composition. The abbreviations of the respective components are as follows.
(Polyfunctional Acrylate)
"ATM-35E"
"NK Ester ATM-35E" from Shin Nakamura Chemical Co., Ltd.
The number of functional groups: 4
The number of ethylene oxide groups: 8.75 per functional group
Proportion by weight of ethylene oxide groups: 0.81
Active component: 100 wt %
"A-200"
"NK Ester A-200" from Shin Nakamura Chemical Co., Ltd.
The number of functional groups: 2
The number of ethylene oxide groups: 2 per functional group
Proportion by weight of ethylene oxide groups: 0.57
Active component: 100 wt %
"A-400"
"NK Ester A-400" from Shin Nakamura Chemical Co., Ltd.
The number of functional groups: 2
The number of ethylene oxide groups: 4.5 per functional group
Proportion by weight of ethylene oxide groups: 0.78
Active component: 100 wt %
"A-600"
"NK Ester A-600" from Shin Nakamura Chemical Co., Ltd.
The number of functional groups: 2
The number of ethylene oxide groups: 7 per functional group
Proportion by weight of ethylene oxide groups: 0.87
Active component: 100 wt %

"A-TMPT-3EO"
"NK Ester A-TMPT-3EO" from Shin Nakamura Chemical Co., Ltd.
The number of functional groups: 3
The number of ethylene oxide groups: 1 per functional group
Proportion by weight of ethylene oxide groups: 0.31
Active component: 100 wt %
"A-GLY-3E"
"NK Ester A-GLY-3E" from Shin Nakamura Chemical Co., Ltd.
The number of functional groups: 3
The number of ethylene oxide groups: 1 per functional group
Proportion by weight of ethylene oxide groups: 0.34
Active component: 100 wt %
"ATM-4E"
"NK Ester ATM-4E" from Shin Nakamura Chemical Co., Ltd.
The number of functional groups: 4
The number of ethylene oxide groups: 1 per functional group
Proportion by weight of ethylene oxide groups: 0.33
Active component: 100 wt %
"DPEA-12"
"KAYARAD DPEA-12" from Nippon Kayaku Co., Ltd.
The number of functional groups: 6
The number of ethylene oxide groups: 2 per functional group
Proportion by weight of ethylene oxide groups: 0.48
Active component: 100 wt %
"U"
"U-10HA" from Shin Nakamura Chemical Co., Ltd.
Ethylene oxide group: not contained
Active component: 100 wt %
"A-DPH"
"NK Ester A-DPH" from Shin Nakamura Chemical Co., Ltd.
Ethylene oxide group: not contained
Active component: 100 wt %
"A-TMPT"
"NK Ester A-TMPT" from Shin Nakamura Chemical Co., Ltd.
Ethylene oxide group: not contained
Active component: 100 wt %

"APG-400"
"NK Ester APG-400" from Shin Nakamura Chemical Co., Ltd.
Ethylene oxide group: not contained
Active component: 100 wt %
"APG-700"
"NK Ester APG-700" from Shin Nakamura Chemical Co., Ltd.
Ethylene oxide group: not contained
Active component: 100 wt %
"ATM-4PL"
"NK Ester ATM-4PL" from Shin Nakamura Chemical Co., Ltd.
Ethylene oxide group: not contained
Active component: 100 wt %
"DPCA-60"
"KAYARAD DPCA-60" from Nippon Kayaku Co., Ltd.
Ethylene oxide group: not contained
Active component: 100 wt %
"DPCA-120"
"KAYARAD DPCA-120" from Nippon Kayaku Co., Ltd.
Ethylene oxide group: not contained
Active component: 100 wt %
(Monofunctional Amide Monomer)
"DM"
"DMAA" from KJ Chemicals Corp.
Active component: 100 wt %
(Release Agent)
"MT70"
"Fomblin MT70" from Solvay
Perfluoropolyether group: contained (fluorine-based release agent)
Active component: 80 wt %
"BYK"
"BYK®-UV3570" from BYK Additives and Instruments
Perfluoropolyether group: not contained (silicone-based release agent)
Active component: 70 wt %
(Polymerization Initiator)
"TPO"
"LUCIRIN TPO" from IGM Resins
Active component: 100 wt %

TABLE 1

| Component | Category | Abbreviation | Polymerizable composition | | | | |
| --- | --- | --- | --- | --- | --- | --- | --- |
| | | | R1 | R2 | R3 | R4 | R5 |
| Polyfunctional acrylate | Component A | ATM-35E | — | — | — | — | — |
| | | A-200 | — | — | — | — | — |
| | | A-400 | 41.8 | 43.8 | — | — | 43.8 |
| | | A-600 | — | — | 29.3 | 39 | — |
| | | A-TMPT-3EO | 28.4 | — | — | — | — |
| | | A-GLY-3E | — | — | 56.3 | 46.6 | — |
| | | ATM-4E | — | 28.4 | — | — | — |
| | | DPEA-12 | — | — | — | — | — |
| | Others | U | — | — | — | — | — |
| | | A-DPH | 12.5 | 13.5 | — | — | — |
| | | A-TMPT | — | — | — | — | 14.4 |
| | | APG-400 | — | — | — | — | — |
| | | APG-700 | — | — | — | — | — |
| | | ATM-4PL | — | — | — | — | 23.6 |
| | | DPCA-60 | — | — | — | — | — |
| | | DPCA-120 | — | — | — | — | — |
| Monofunctional amide monomer | Component B | DM | 13.5 | 10.5 | 10.6 | 10.6 | 14.4 |

TABLE 1-continued

|  |  |  | Polymerizable composition | | | | |
|---|---|---|---|---|---|---|---|
| Component | Category | Abbreviation | R1 | R2 | R3 | R4 | R5 |
| Release agent | Component C | MT70 | 2.375 | 2.375 | 2.375 | 2.375 | 2.375 |
|  | Others | BYK | — | — | — | — | — |
| Polymerization initiator | — | TPO | 1.9 | 1.9 | 1.9 | 1.9 | 1.9 |

TABLE 2

|  |  |  | Polymerizable composition | | | | |
|---|---|---|---|---|---|---|---|
| Component | Category | Abbreviation | R6 | R7 | R8 | R9 | R10 |
| Polyfunctional acrylate | Component A | ATM-35E | — | — | — | — | — |
|  |  | A-200 | — | — | — | — | — |
|  |  | A-400 | 19.7 | 43.8 | — | — | 11.5 |
|  |  | A-600 | — | — | — | — | — |
|  |  | A-TMPT-3EO | — | — | — | — | — |
|  |  | A-GLY-3E | — | — | — | — | — |
|  |  | ATM-4E | — | — | — | — | — |
|  |  | DPEA-12 | 33.7 | — | 70.2 | 75 | 63.5 |
|  | Others | U | — | — | — | — | — |
|  |  | A-DPH | — | — | — | — | — |
|  |  | A-TMPT | 33.2 | 9.6 | 4.8 | — | — |
|  |  | APG-400 | — | — | — | — | — |
|  |  | APG-700 | — | — | — | — | — |
|  |  | ATM-4PL | — | — | — | — | — |
|  |  | DPCA-60 | — | 23.6 | — | — | — |
|  |  | DPCA-120 | — | — | — | — | — |
| Monofunctional amide monomer | Component B | DM | 9.6 | 19.2 | 21.2 | 21.2 | 21.2 |
| Release agent | Component C | MT70 | 2.375 | 2.375 | 2.375 | 2.375 | 2.375 |
|  | Others | BYK | — | — | — | — | — |
| Polymerization initiator | — | TPO | 1.9 | 1.9 | 1.9 | 1.9 | 1.9 |

TABLE 3

|  |  |  | Polymerizable composition | | | |
|---|---|---|---|---|---|---|
| Component | Category | Abbreviation | R11 | R12 | R13 | R14 |
| Polyfunctional acrylate | Component A | ATM-35E | — | — | — | — |
|  |  | A-200 | — | — | — | — |
|  |  | A-400 | 48.3 | 51.3 | 49.4 | — |
|  |  | A-600 | — | — | — | 49.4 |
|  |  | A-TMPT-3EO | — | — | — | — |
|  |  | A-GLY-3E | 41.4 | — | — | — |
|  |  | ATM-4E | — | — | — | — |
|  |  | DPEA-12 | — | — | — | — |
|  | Others | U | — | 31.4 | 27.6 | 27.6 |
|  |  | A-DPH | — | — | — | — |
|  |  | A-TMPT | — | — | — | — |
|  |  | APG-400 | — | — | — | — |
|  |  | APG-700 | — | — | — | — |
|  |  | ATM-4PL | — | — | — | — |
|  |  | DPCA-60 | — | — | — | — |
|  |  | DPCA-120 | — | — | — | — |
| Monofunctional amide monomer | Component B | DM | 6.5 | 13.5 | 19.2 | 19.2 |
| Release agent | Component C | MT70 | 2.375 | 2.375 | 2.375 | 2.375 |
|  | Others | BYK | — | — | — | — |
| Polymerization initiator | — | TPO | 1.9 | 1.9 | 1.9 | 1.9 |

TABLE 4

| Component | Category | Abbreviation | Polymerizable composition | | | |
|---|---|---|---|---|---|---|
| | | | R15 | R16 | R17 | R18 |
| Polyfunctional acrylate | Component A | ATM-35E | — | — | — | — |
| | | A-200 | — | — | — | — |
| | | A-400 | 32 | 42.8 | 35 | 65.4 |
| | | A-600 | — | — | — | — |
| | | A-TMPT-3EO | — | — | — | — |
| | | A-GLY-3E | — | — | — | — |
| | | ATM-4E | — | — | — | — |
| | | DPEA-12 | — | — | — | — |
| | Others | U | 33 | 22.6 | 27.5 | 23.6 |
| | | A-DPH | — | — | — | — |
| | | A-TMPT | — | — | — | — |
| | | APG-400 | 14.4 | — | — | — |
| | | APG-700 | — | 13.5 | 14.5 | — |
| | | ATM-4PL | — | — | — | — |
| | | DPCA-60 | — | — | — | — |
| | | DPCA-120 | — | — | — | — |
| Monofunctional amide monomer | Component B | DM | 16.8 | 17.3 | 19.2 | 7.2 |
| Release agent | Component C | MT70 | 2.375 | 2.375 | 2.375 | 2.375 |
| | Others | BYK | — | — | — | — |
| Polymerization initiator | — | TPO | 1.9 | 1.9 | 1.9 | 1.9 |

TABLE 5

| Component | Category | Abbreviation | Polymerizable composition | | | |
|---|---|---|---|---|---|---|
| | | | R19 | R20 | R21 | R22 |
| Polyfunctional acrylate | Component A | ATM-35E | — | — | — | — |
| | | A-200 | — | — | — | 54.8 |
| | | A-400 | 46.6 | 43.8 | 42.8 | — |
| | | A-600 | — | — | — | — |
| | | A-TMPT-3EO | — | — | — | — |
| | | A-GLY-3E | — | — | — | — |
| | | ATM-4E | — | — | — | — |
| | | DPEA-12 | — | — | — | 11.6 |
| | Others | U | 23.6 | — | — | 9.6 |
| | | A-DPH | — | — | — | — |
| | | A-TMPT | 18.8 | 14.4 | 12 | 9.6 |
| | | APG-400 | — | — | — | — |
| | | APG-700 | — | — | — | — |
| | | ATM-4PL | — | 25 | 19.7 | — |
| | | DPCA-60 | — | — | — | — |
| | | DPCA-120 | — | — | — | — |
| Monofunctional amide monomer | Component B | DM | 7.2 | 14.4 | 14.4 | 10.6 |
| Release agent | Component C | MT70 | 2.375 | 0.625 | 11.5 | 2.375 |
| | Others | BYK | — | — | — | — |
| Polymerization initiator | — | TPO | 1.9 | 1.9 | 1.9 | 1.9 |

TABLE 6

| Component | Category | Abbreviation | Polymerizable composition | | | | |
|---|---|---|---|---|---|---|---|
| | | | r1 | r2 | r3 | r4 | r5 |
| Polyfunctional acrylate | Component A | ATM-35E | 25 | — | — | — | — |
| | | A-200 | — | — | — | — | — |
| | | A-400 | — | — | 16.8 | 28.8 | 48.6 |
| | | A-600 | — | 48.6 | — | — | — |
| | | A-TMPT-3EO | — | — | — | — | — |
| | | A-GLY-3E | — | 37 | — | — | 42.8 |
| | | ATM-4E | — | — | — | — | — |
| | | DPEA-12 | 50 | — | 23.6 | — | — |

TABLE 6-continued

|  |  |  | Polymerizable composition | | | | |
|---|---|---|---|---|---|---|---|
| Component | Category | Abbreviation | r1 | r2 | r3 | r4 | r5 |
|  | Others | U | — | — | — | — | — |
|  |  | A-DPH | — | — | — | — | — |
|  |  | A-TMPT | — | — | 46.2 | 9.8 | — |
|  |  | APG-400 | — | — | — | — | — |
|  |  | APG-700 | — | — | — | — | — |
|  |  | ATM-4PL | — | — | — | — | — |
|  |  | DPCA-60 | — | — | — | — | — |
|  |  | DPCA-120 | — | — | — | 28.8 | — |
| Monofunctional amide monomer | Component B | DM | 21.2 | 10.6 | 9.6 | 28.8 | 4.8 |
| Release agent | Component C | MT70 | 2.375 | 2.375 | 2.375 | 2.375 | 2.375 |
|  | Others | BYK | — | — | — | — | — |
| Polymerization initiator | — | TPO | 1.9 | 1.9 | 1.9 | 1.9 | 1.9 |

TABLE 7

|  |  |  | Polymerizable composition | | | |
|---|---|---|---|---|---|---|
| Component | Category | Abbreviation | r6 | r7 | r8 | r9 |
| Polyfunctional acrylate | Component A | ATM-35E | — | — | — | — |
|  |  | A-200 | — | — | — | — |
|  |  | A-400 | 66.8 | 71.6 | 63.8 | 58.7 |
|  |  | A-600 | — | — | — | — |
|  |  | A-TMPT-3EO | — | — | — | — |
|  |  | A-GLY-3E | — | — | — | — |
|  |  | ATM-4E | — | — | — | — |
|  |  | DPEA-12 | — | — | — | — |
|  | Others | U | 15 | 15 | 13.2 | 32.7 |
|  |  | A-DPH | — | — | — | — |
|  |  | A-TMPT | — | — | — | — |
|  |  | APG-400 | — | — | — | — |
|  |  | APG-700 | — | — | — | — |
|  |  | ATM-4PL | — | — | — | — |
|  |  | DPCA-60 | — | — | — | — |
|  |  | DPCA-120 | — | — | — | — |
| Monofunctional amide monomer | Component B | DM | 14.4 | 9.6 | 19.2 | 4.8 |
| Release agent | Component C | MT70 | 2.375 | 2.375 | 2.375 | 2.375 |
|  | Others | BYK | — | — | — | — |
| Polymerization initiator | — | TPO | 1.9 | 1.9 | 1.9 | 1.9 |

TABLE 8

|  |  |  | Polymerizable composition | | | |
|---|---|---|---|---|---|---|
| Component | Category | Abbreviation | r10 | r11 | r12 | r13 |
| Polyfunctional acrylate | Component A | ATM-35E | — | — | — | — |
|  |  | A-200 | — | — | — | — |
|  |  | A-400 | 40.4 | 40.8 | — | — |
|  |  | A-600 | — | — | 49.6 | 48 |
|  |  | A-TMPT-3EO | — | — | — | — |
|  |  | A-GLY-3E | — | — | 37.9 | 36.8 |
|  |  | ATM-4E | — | — | — | — |
|  |  | DPEA-12 | — | — | — | — |
|  | Others | U | 26 | — | — | — |
|  |  | A-DPH | — | — | — | — |
|  |  | A-TMPT | 25 | 12 | — | — |
|  |  | APG-400 | — | — | — | — |
|  |  | APG-700 | — | — | — | — |
|  |  | ATM-4PL | — | 18.7 | — | — |
|  |  | DPCA-60 | — | — | — | — |
|  |  | DPCA-120 | — | — | — | — |

TABLE 8-continued

|  |  |  | Polymerizable composition | | | |
|---|---|---|---|---|---|---|
| Component | Category | Abbreviation | r10 | r11 | r12 | r13 |
| Monofunctional amide monomer | Component B | DM | 4.8 | 14.4 | 10.6 | 10.6 |
| Release agent | Component C | MT70 | 2.375 | 15.25 | — | — |
|  | Others | BYK | — | — | — | 2.7 |
| Polymerization initiator | — | TPO | 1.9 | 1.9 | 1.9 | 1.9 |

Tables 9 to 16 show the following amounts (1) to (4) in terms of active components.

(1) Component A to C contents in the polymerizable composition (in the tables, "Component A content", "Component B content", and "Component C content")

(2) Ethylene oxide group content of Component A in the polymerizable composition (in the tables, "EO group content")

(3) Amide group content of Component B in the polymerizable composition (in the tables, "amide group content")

(4) The total of the ethylene oxide group content of Component A and the Component B content in the polymerizable composition (in the tables, "total of EO group content and Component B content")

TABLE 9

|  | Polymerizable composition | | | | |
|---|---|---|---|---|---|
|  | R1 | R2 | R3 | R4 | R5 |
| Component A content (wt %) | 70.2 | 72.2 | 85.6 | 85.6 | 43.8 |
| Component B content (wt %) | 13.5 | 10.5 | 10.6 | 10.6 | 14.4 |
| Component C content (wt %) | 1.9 | 1.9 | 1.9 | 1.9 | 1.9 |
| EO group content (wt %) | 41.3 | 43.6 | 44.7 | 49.9 | 34.1 |
| Amide group content (mmol/g) | 1.36 | 1.06 | 1.07 | 1.07 | 1.45 |
| Total of EO group content and Component B content (wt %) | 54.8 | 54.1 | 55.3 | 60.5 | 48.5 |

TABLE 10

|  | Polymerizable composition | | | | |
|---|---|---|---|---|---|
|  | R6 | R7 | R8 | R9 | R10 |
| Component A content (wt %) | 53.4 | 43.8 | 70.2 | 75.0 | 75.0 |
| Component B content (wt %) | 9.6 | 19.2 | 21.2 | 21.2 | 21.2 |
| Component C content (wt %) | 1.9 | 1.9 | 1.9 | 1.9 | 1.9 |
| EO group content (wt %) | 31.4 | 34.1 | 33.5 | 35.8 | 39.3 |
| Amide group content (mmol/g) | 0.97 | 1.94 | 2.14 | 2.14 | 2.14 |
| Total of EO group content and Component B content (wt %) | 41.0 | 53.3 | 54.7 | 57.0 | 60.5 |

TABLE 11

|  | Polymerizable composition | | | |
|---|---|---|---|---|
|  | R11 | R12 | R13 | R14 |
| Component A content (wt %) | 89.7 | 51.3 | 49.4 | 49.4 |
| Component B content (wt %) | 6.5 | 13.5 | 19.2 | 19.2 |
| Component C content (wt %) | 1.9 | 1.9 | 1.9 | 1.9 |

TABLE 11-continued

|  | Polymerizable composition | | | |
|---|---|---|---|---|
|  | R11 | R12 | R13 | R14 |
| EO group content (wt %) | 51.8 | 40.0 | 38.5 | 43.0 |
| Amide group content (mmol/g) | 0.66 | 1.36 | 1.94 | 1.94 |
| Total of EO group content and Component B content (wt %) | 58.3 | 53.5 | 57.7 | 62.2 |

TABLE 12

|  | Polymerizable composition | | | |
|---|---|---|---|---|
|  | R15 | R16 | R17 | R18 |
| Component A content (wt %) | 32.0 | 42.8 | 35.0 | 65.4 |
| Component B content (wt %) | 16.8 | 17.3 | 19.2 | 7.2 |
| Component C content (wt %) | 1.9 | 1.9 | 1.9 | 1.9 |
| EO group content (wt %) | 24.9 | 33.4 | 27.3 | 51.0 |
| Amide group content (mmol/g) | 1.70 | 1.75 | 1.94 | 0.73 |
| Total of EO group content and Component B content (wt %) | 41.7 | 50.7 | 46.5 | 58.2 |

TABLE 13

|  | Polymerizable composition | | | |
|---|---|---|---|---|
|  | R19 | R20 | R21 | R22 |
| Component A content (wt %) | 46.6 | 43.8 | 42.8 | 66.4 |
| Component B content (wt %) | 7.2 | 14.4 | 14.4 | 10.6 |
| Component C content (wt %) | 1.9 | 0.5 | 9.2 | 1.9 |
| EO group content (wt %) | 36.3 | 34.1 | 33.4 | 36.8 |
| Amide group content (mmol/g) | 0.73 | 1.45 | 1.45 | 1.07 |
| Total of EO group content and Component B content (wt %) | 43.5 | 48.5 | 47.8 | 47.4 |

TABLE 14

|  | Polymerizable composition | | | | |
|---|---|---|---|---|---|
|  | r1 | r2 | r3 | r4 | r5 |
| Component A content (wt %) | 75.0 | 85.6 | 40.4 | 28.8 | 91.4 |
| Component B content (wt %) | 21.2 | 10.6 | 9.6 | 28.8 | 4.8 |
| Component C content (wt %) | 1.9 | 1.9 | 1.9 | 1.9 | 1.9 |

TABLE 14-continued

|  | Polymerizable composition | | | | |
| --- | --- | --- | --- | --- | --- |
|  | r1 | r2 | r3 | r4 | r5 |
| EO group content (wt %) | 44.2 | 54.9 | 24.4 | 22.5 | 52.5 |
| Amide group content (mmol/g) | 2.14 | 1.07 | 0.97 | 2.91 | 0.48 |
| Total of EO group content and Component B content (wt %) | 65.4 | 65.5 | 34.0 | 51.3 | 57.3 |

TABLE 15

|  | Polymerizable composition | | | |
| --- | --- | --- | --- | --- |
|  | r6 | r7 | r8 | r9 |
| Component A content (wt %) | 66.8 | 71.6 | 63.8 | 58.7 |
| Component B content (wt %) | 14.4 | 9.6 | 19.2 | 4.8 |
| Component C content (wt %) | 1.9 | 1.9 | 1.9 | 1.9 |
| EO group content (wt %) | 52.1 | 55.8 | 49.7 | 45.8 |
| Amide group content (mmol/g) | 1.45 | 0.97 | 1.94 | 0.48 |
| Total of EO group content and Component B content (wt %) | 66.5 | 65.4 | 68.9 | 50.6 |

TABLE 16

|  | Polymerizable composition | | | |
| --- | --- | --- | --- | --- |
|  | r10 | r11 | r12 | r13 |
| Component A content (wt %) | 40.4 | 40.8 | 87.5 | 84.8 |
| Component B content (wt %) | 4.8 | 14.4 | 10.6 | 10.6 |
| Component C content (wt %) | 1.9 | 12.2 | 0 | 0 |
| EO group content (wt %) | 31.5 | 31.8 | 56.1 | 54.3 |
| Amide group content (mmol/g) | 0.48 | 1.45 | 1.07 | 1.07 |
| Total of EO group content and Component B content (wt %) | 36.3 | 46.2 | 66.7 | 64.9 |

Example 1

An antifouling film of Example 1 was produced by the following method.

(Process 1)

The polymerizable composition R1 was applied in a belt-like pattern. The polymerizable composition R1 was applied in accordance with two specifications, namely a specification in which the polymerizable composition R1 is applied to a surface of the substrate 2 (hereinafter, also referred to as Specification 1) and a specification in which the polymerizable composition R1 is applied to a surface of an end of the die 6 (hereinafter, also referred to as Specification 2). The workpieces to which the polymerizable composition R1 was applied (substrate 2 and die 6) were heated in an oven at 80° C. for one minute, so that the solvent was evaporated from the polymerizable composition R1.

(Process 2)

The substrate 2 was pushed to the die 6 with the polymerizable composition R1 (from which the solvent was evaporated) in between using a hand roller. As a result, an uneven structure was formed on a surface (surface remote from the substrate 2) of the polymerizable composition R1.

(Process 3)

The polymerizable composition R1 having the uneven structure on the surface thereof was irradiated with ultraviolet rays (dose: 1 J/cm$^2$) from the substrate 2 side, so that the polymerizable composition R1 was cured. As a result, the polymer layer 3 was formed.

(Process 4) The die 6 was released from the polymer layer 3. As a result, the antifouling film 1 was completed. The thickness T of the polymer layer 3 was 9.8 μm both in Specifications 1 and 2.

The surface specifications of the antifouling film 1 were as follows both in Specifications 1 and 2.

Shape of projections 4: temple-bell-like shape
Average pitch of projections 4: 200 nm
Average height of projections 4: 200 nm
Average aspect ratio of projections 4: 1.0

The surface specifications of the antifouling film 1 were evaluated using a scanning electron microscope "S-4700" from Hitachi High-Technologies Corp. For the evaluation, osmium(VIII) oxide from Wako Pure Chemical Industries, Ltd. was applied (to a thickness of 5 nm) on the surface (the surface remote from the substrate 2) of the polymer layer 3 using an osmium coater "Neoc-ST" from Meiwafosis Co., Ltd.

Examples 2 to 22 and Comparative Examples 1 to 13

An antifouling film of each example was produced in the same manner as in Example 1, except that the composition was changed as shown in Tables 17 to 24.

[Evaluations]

The antifouling films of the examples were subjected to the following evaluations. Tables 17 to 24 show the results.

<Antifouling Properties>

For the antifouling properties, the water repellency, the oil repellency, and the ease of wiping off fingerprints of the antifouling film of each example in Specification 1 were evaluated.

(Water Repellency)

Water was dropped on the surface (the surface remote from the substrate) of the polymer layer of the antifouling film of each example, and the contact angle was measured immediately after the dropping.

(Oil Repellency)

Hexadecane was dropped on the surface (the surface remote from the substrate) of the polymer layer of the antifouling film of each example, and the contact angle was measured immediately after the dropping.

The contact angles were each the average value of contact angles measured at the following three points by the θ/2 method (θ/2=arctan(h/r), wherein θ: contact angle, r: radius of droplet, h: height of droplet) using a portable contact angle meter "PCA-1" from Kyowa Interface Science Co., Ltd. The first measurement point selected was the central portion of the antifouling film of each example. The second and third measurement points were two points that were 20 mm or more apart from the first measurement point and were point-symmetrical to each other about the first measurement point.

(Ease of Wiping Off Fingerprints)

First, for the antifouling film of each example, a black acrylic sheet was attached to the surface remote from the polymer layer of the substrate with an optical adhesive layer in between. Next, artificially contaminated liquid from Isekyu Co., Ltd. was brought into contact with a rubber-gloved finger using "Bemcot® S-2" from Asahi Kasei Fibers Corp. impregnated with 0.1 ml of the artificially contaminated liquid. The artificially contaminated liquid was attached as a supposed fingerprint to the surface (the surface remote from the substrate) of the polymer layer of the antifouling film of each example with the finger. After 10 minutes, the surface was rubbed 10 times in a reciprocating motion using "Bemcot S-2" from Asahi Kasei Fibers Corp. Whether the artificially contaminated liquid was wiped off or not was visually observed in an environment with an illuminance of 100 lx (fluorescent lamp). The evaluation criteria were as follows.

Good: The artificially contaminated liquid was completely wiped off and no wiping residue was observed.

Fair: The artificially contaminated liquid was not obvious, but slight wiping residue was observed when the light from the fluorescent lamp was reflected on the surface.

Poor: The artificially contaminated liquid was not wiped off at all.

The cases evaluated as good or fair were considered as within the allowable level (having excellent ease of wiping off fingerprints).

<Fingerprint Emerging State>

The antifouling film of each example whose ease of wiping off fingerprints was evaluated was left at a temperature of 30° C. and a humidity of 85% for 12 hours. The emerging state of the artificially contaminated liquid attached as a supposed fingerprint was visually observed in an environment with an illuminance of 100 lx (fluorescent lamp). The evaluation criteria were as follows.

A: The artificially contaminated liquid did not emerge both when the light from the fluorescent lamp was reflected on the surface and when the light was not reflected on the surface.

B: The artificially contaminated liquid emerged slightly when the light from the fluorescent lamp was reflected on the surface but the liquid did not emerge when the light was not reflected on the surface.

C: The artificially contaminated liquid emerged when the light from the fluorescent lamp was reflected on the surface but the liquid did not emerge when the light was not reflected on the surface.

D: The artificially contaminated liquid emerged clearly when the light from the fluorescent lamp was reflected on the surface and the liquid emerged slightly when the light was not reflected on the surface.

E: The artificially contaminated liquid emerged clearly both when the light from the fluorescent lamp was reflected on the surface and when the light was not reflected on the surface.

The cases evaluated as A, B, or C were considered as within the allowable level (reducing the fingerprint emergence at high humidity).

<Adhesion>

The adhesion of the antifouling films of each example in Specifications 1 and 2 was evaluated by the following method. Specification 2 is less likely to distribute fluorine atoms on the surface (the surface remote from the substrate) of the polymer layer at a high concentration, i.e., more likely to distribute fluorine atoms on the substrate side of the polymer layer, than Specification 1. Hence, Specification 2 is supposed to achieve lower adhesion than Specification 1.

First, at a temperature of 23° C. and a humidity of 50%, 11 vertical cuts and 11 horizontal cuts were made in a grid pattern with 1 mm spacing on the surface (the surface remote from the substrate) of the polymer layer using a snap-off utility knife. Thereby, 100 squares (1 mm square) were formed. Then, polyester adhesive tape "No. 31B" from Nitto Denko Corp. was press-applied to the squares and peeled off in the 90° direction relative to the surface of the squares at a rate of 100 mm/s. The state of the polymer layer on the substrate after the peeling was visually observed. The results are shown as "X" (X means the number of squares in which the polymer layer was not peeled off but left on the substrate). The evaluation criteria were as follows.

(Adhesion in Specification 1)
 A: X=100
 B: X=1 to 99
 C: X=0

The cases evaluated as A were considered as within the allowable level (having excellent adhesion in Specification 1).

(Adhesion in Specification 2)
 a: X=100
 b: X=90 to 99
 c: X=0 to 89

The cases evaluated as a or b were considered as within the allowable level (having excellent adhesion in Specification 2).

The comprehensive evaluation of the adhesion was made based on the adhesion in Specification 1 and the adhesion in Specification 2. The evaluation criteria were as follows.

Good: The adhesion in Specification 1 was A and the adhesion in Specification 2 was a.

Fair: The adhesion in Specification 1 was A and the adhesion in Specification 2 was b.

Poor: The adhesion in Specification 1 was B or C and/or the adhesion in Specification 2 was c.

The cases evaluated comprehensively as good or fair were considered as within the allowable level (having excellent adhesion).

<Rubbing Resistance>

For the rubbing resistance, the steel wool resistance of the antifouling film of each example in Specification 1 was evaluated.

(Steel Wool Resistance)

First, the surface (the surface remote from the substrate) of the antifouling film of each example was rubbed with steel wool "#0000" from Nippon Steel Wool Co., Ltd. with a load of 400 g applied to the steel wool. The surface (the surface remote from the substrate) of the polymer layer of the antifouling film of each example was visually observed in an environment with an illuminance of 100 lx (fluorescent lamp) and the number "N" of scratches on the surface was counted. The surface was rubbed with the steel wool using a surface property tester "HEIDON-14FW" from Shinto Scientific Co., Ltd. as the test machine, with a stroke width of 30 mm, a rate of 100 mm/s, and the number of times of rubbing of 10 in a reciprocating motion. The evaluation criteria were as follows.
 A: N=0
 B: N=1 to 3
 C: N=4 to 10
 D: N=11 to 20
 E: N≥21

The cases evaluated as A, B, or C were considered as within the allowable level (having excellent steel wool resistance).

<Reliability>

For the reliability, the bleed-out state of the antifouling film of each example in Specification 1 was evaluated.

(Bleed-Out State)

The antifouling film of each example was subjected to a high temperature/high humidity test where the film was left at a temperature of 60° C. and a humidity of 95% for 1000 hours. The cloudiness level of the polymer layer of the antifouling film of each example was visually observed in an environment with an illuminance of 100 lx (fluorescent lamp). The antifouling films whose polymer layer did not turn cloudy as a result of the visual observation were determined as not causing bleed-out, and were therefore evaluated as having good reliability. The antifouling films whose polymer layer turned cloudy were determined as causing bleed-out, and were therefore evaluated as having poor reliability. When determination by visual observation is difficult, the specular reflection spectra at an angle of incidence of 5° measured before and after the high temperature/high humidity test were superposed on each other, and the reliability was evaluated based on whether or not the spectra were aligned. Specifically, the antifouling films with the same reflectance in the spectra before and after the high temperature/high humidity test were determined as having good reliability, and the antifouling films with different reflectances in the spectra before and after the high temperature/high humidity test (when the overall reflectance increased after the high temperature/high humidity test) were determined as having poor reliability. The specular spectrum at an angle of incidence of 5° was measured as follows. A black acrylic sheet was attached to the surface remote from the polymer layer of the substrate of the antifouling film of each example. The surface (the surface remote from the substrate) of the polymer layer of the antifouling film of each example was irradiated with light from a light source at a polar angle of 5°, so that the specular reflection spectrum at a wavelength of 380 to 780 nm was measured using "UV-3100PC" from Shimadzu Corporation.

TABLE 17

| | | | Example 1 | Example 2 | Example 3 | Example 4 | Example 5 |
|---|---|---|---|---|---|---|---|
| Polymerizable composition | | | R1 | R2 | R3 | R4 | R5 |
| Antifouling properties | Water repellency | Contact angle with water (°) | 155 | 153 | 152 | 154 | 156 |
| | Oil repellency | Contact angle with hexadecane (°) | 89 | 90 | 89 | 90 | 92 |
| | Ease of wiping off fingerprints | | Good | Good | Good | Good | Good |
| Fingerprint emerging state | | | A | A | B | C | A |
| Adhesion | Specification 1 | Results (number) | 100 | 100 | 100 | 100 | 100 |
| | | Evaluation | A | A | A | A | A |
| | Specification 2 | Results (number) | 100 | 100 | 100 | 100 | 100 |
| | | Evaluation | a | a | a | a | a |
| | Comprehensive evaluation | | Good | Good | Good | Good | Good |
| Rubbing resistance | Steel wool resistance | | A | A | A | B | B |
| Reliability | Bleed-out state | | Good | Good | Good | Good | Good |

TABLE 18

| | | | Example 6 | Example 7 | Example 8 | Example 9 | Example 10 |
|---|---|---|---|---|---|---|---|
| Polymerizable composition | | | R6 | R7 | R8 | R9 | R10 |
| Antifouling properties | Water repellency | Contact angle with water (°) | 158 | 159 | 152 | 158 | 155 |
| | Oil repellency | Contact angle with hexadecane (°) | 90 | 93 | 88 | 82 | 90 |
| | Ease of wiping off fingerprints | | Good | Good | Good | Good | Good |
| Fingerprint emerging state | | | A | A | A | B | C |
| Adhesion | Specification 1 | Results (number) | 100 | 100 | 100 | 100 | 100 |
| | | Evaluation | A | A | A | A | A |
| | Specification 2 | Results (number) | 97 | 100 | 100 | 100 | 100 |
| | | Evaluation | b | a | a | a | a |
| | Comprehensive evaluation | | Fair | Good | Good | Good | Good |
| Rubbing resistance | Steel wool resistance | | C | B | C | C | B |
| Reliability | Bleed-out state | | Good | Good | Good | Good | Good |

TABLE 19

| | | | Example 11 | Example 12 | Example 13 | Example 14 |
|---|---|---|---|---|---|---|
| Polymerizable composition | | | R11 | R12 | R13 | R14 |
| Antifouling properties | Water repellency | Contact angle with water (°) | 150 | 148 | 150 | 151 |
| | Oil repellency | Contact angle with hexadecane (°) | 88 | 85 | 86 | 84 |
| | Ease of wiping off fingerprints | | Good | Good | Good | Good |
| Fingerprint emerging state | | | B | A | B | C |
| Adhesion | Specification 1 | Results (number) | 100 | 100 | 100 | 100 |
| | | Evaluation | A | A | A | A |
| | Specification 2 | Results (number) | 91 | 100 | 100 | 100 |
| | | Evaluation | b | a | a | a |
| | Comprehensive evaluation | | Fair | Good | Good | Good |

TABLE 19-continued

|  |  | Example 11 | Example 12 | Example 13 | Example 14 |
|---|---|---|---|---|---|
| Rubbing resistance | Steel wool resistance | A | B | B | B |
| Reliability | Bleed-out state | Good | Good | Good | Good |

TABLE 20

|  |  |  | Example 15 | Example 16 | Example 17 | Example 18 |
|---|---|---|---|---|---|---|
| Polymerizable composition |  |  | R15 | R16 | R17 | R18 |
| Antifouling properties | Water repellency | Contact angle with water (°) | 152 | 150 | 153 | 145 |
|  | Oil repellency | Contact angle with hexadecane (°) | 89 | 85 | 85 | 88 |
|  |  | Ease of wiping off fingerprints | Good | Good | Good | Good |
| Fingerprint emerging state |  |  | A | A | A | B |
| Adhesion | Specification 1 | Results (number) | 100 | 100 | 100 | 100 |
|  |  | Evaluation | A | A | A | A |
|  | Specification 2 | Results (number) | 100 | 100 | 100 | 92 |
|  |  | Evaluation | a | a | a | b |
|  |  | Comprehensive evaluation | Good | Good | Good | Fair |
| Rubbing resistance | Steel wool resistance |  | C | B | B | B |
| Reliability | Bleed-out state |  | Good | Good | Good | Good |

TABLE 21

|  |  |  | Example 19 | Example 20 | Example 21 | Example 22 |
|---|---|---|---|---|---|---|
| Polymerizable composition |  |  | R19 | R20 | R21 | R22 |
| Antifouling properties | Water repellency | Contact angle with water (°) | 146 | 138 | 164 | 153 |
|  | Oil repellency | Contact angle with hexadecane (°) | 82 | 55 | 93 | 89 |
|  |  | Ease of wiping off fingerprints | Good | Fair | Good | Good |
| Fingerprint emerging state |  |  | A | A | A | A |
| Adhesion | Specification 1 | Results (number) | 100 | 100 | 100 | 100 |
|  |  | Evaluation | A | A | A | A |
|  | Specification 2 | Results (number) | 94 | 100 | 100 | 100 |
|  |  | Evaluation | b | a | a | a |
|  |  | Comprehensive evaluation | Fair | Good | Good | Good |
| Rubbing resistance | Steel wool resistance |  | C | B | B | B |
| Reliability | Bleed-out state |  | Good | Good | Good | Good |

TABLE 22

|  |  |  | Comparative Example 1 | Comparative Example 2 | Comparative Example 3 | Comparative Example 4 | Comparative Example 5 |
|---|---|---|---|---|---|---|---|
| Polymerizable composition |  |  | r1 | r2 | r3 | r4 | r5 |
| Antifouling properties | Water repellency | Contact angle with water (°) | 158 | 155 | 149 | 158 | 148 |
|  | Oil repellency | Contact angle with hexadecane (°) | 90 | 89 | 84 | 92 | 87 |
|  |  | Ease of wiping off fingerprints | Good | Good | Good | Good | Good |
| Fingerprint emerging state |  |  | D | D | A | A | B |
| Adhesion | Specification 1 | Results (number) | 100 | 100 | 100 | 100 | 97 |
|  |  | Evaluation | A | A | A | A | B |
|  | Specification 2 | Results (number) | 100 | 100 | 97 | 100 | 0 |
|  |  | Evaluation | a | a | b | a | c |
|  |  | Comprehensive evaluation | Good | Good | Fair | Good | Poor |
| Rubbing resistance | Steel wool resistance |  | C | B | E | D | A |
| Reliability | Bleed-out state |  | Good | Good | Good | Good | Good |

TABLE 23

|  |  |  | Comparative Example 6 | Comparative Example 7 | Comparative Example 8 | Comparative Example 9 |
|---|---|---|---|---|---|---|
| Polymerizable composition |  |  | r6 | r7 | r8 | r9 |
| Antifouling properties | Water repellency | Contact angle with water (°) | 149 | 150 | 148 | 145 |
|  | Oil repellency | Contact angle with hexadecane (°) | 85 | 80 | 84 | 83 |
|  |  | Ease of wiping off fingerprints | Good | Good | Good | Good |
| Fingerprint emerging state |  |  | D | D | E | A |
| Adhesion | Specification 1 | Results (number) | 100 | 100 | 100 | 100 |
|  |  | Evaluation | A | A | A | A |
|  | Specification 2 | Results (number) | 100 | 95 | 100 | 0 |
|  |  | Evaluation | a | b | a | c |
|  | Comprehensive evaluation |  | Good | Fair | Good | Poor |
| Rubbing resistance | Steel wool resistance |  | B | B | B | B |
| Reliability | Bleed-out state |  | Good | Good | Good | Good |

TABLE 24

|  |  |  | Comparative Example 10 | Comparative Example 11 | Comparative Example 12 | Comparative Example 13 |
|---|---|---|---|---|---|---|
| Polymerizable composition |  |  | r10 | r11 | r12 | r13 |
| Antifouling properties | Water repellency | Contact angle with water (°) | 149 | 165 | 16 | 84 |
|  | Oil repellency | Contact angle with hexadecane (°) | 82 | 94 | 9 | 10 |
|  |  | Ease of wiping off fingerprints | Good | Good | Poor | Poor |
| Fingerprint emerging state |  |  | A | A | B | C |
| Adhesion | Specification 1 | Results (number) | 99 | 100 | 100 | 100 |
|  |  | Evaluation | B | A | A | A |
|  | Specification 2 | Results (number) | 0 | 100 | 100 | 100 |
|  |  | Evaluation | c | a | a | a |
|  | Comprehensive evaluation |  | Poor | Good | Good | Good |
| Rubbing resistance | Steel wool resistance |  | D | B | E | C |
| Reliability | Bleed-out state |  | Good | Poor | Good | Good |

As shown in Tables 17 to 21, Examples 1 to 22 each achieved an antifouling film that was excellent in the antifouling properties, adhesion, rubbing resistance, and reliability, and reduced fingerprint emergence at high humidity. In particular, in Examples 1, 2, 3, and 11, the increase in rubbing resistance and the reduction in fingerprint emergence at high humidity were achieved in a balanced manner.

In contrast, as shown in Tables 22 to 24, Comparative Examples 1 to 13 each failed to achieve an antifouling film that was excellent in the antifouling properties, adhesion, rubbing resistance, and reliability, and reduced fingerprint emergence at high humidity.

In Comparative Example 1, the fingerprint emergence at high humidity was not reduced since in the polymerizable composition r1, the total of the ethylene oxide group content of Component A and the Component B content in terms of active components was higher than 65 wt %.

In Comparative Example 2, the fingerprint emergence at high humidity was not reduced since in the polymerizable composition r2, the total of the ethylene oxide group content of Component A and the Component B content in terms of active components was higher than 65 wt %.

In Comparative Example 3, the rubbing resistance was low since in the polymerizable composition r3, the total of the ethylene oxide group content of Component A and the Component B content in terms of active components was lower than 40 wt %.

In Comparative Example 4, the rubbing resistance was low since in the polymerizable composition r4, the Component B content in terms of active components was higher than 25 wt %.

In Comparative Example 5, the adhesion was low since in the polymerizable composition r5, the Component B content in terms of active components was lower than 5 wt %.

In Comparative Example 6, the fingerprint emergence at high humidity was not reduced since in the polymerizable composition r6, the total of the ethylene oxide group content of Component A and the Component B content in terms of active components was higher than 65 wt %.

In Comparative Example 7, the fingerprint emergence at high humidity was not reduced since in the polymerizable composition r7, the total of the ethylene oxide group content of Component A and the Component B content in terms of active components was higher than 65 wt %.

In Comparative Example 8, the fingerprint emergence at high humidity was not reduced since in the polymerizable composition r8, the total of the ethylene oxide group content of Component A and the Component B content in terms of active components was higher than 65 wt %.

In Comparative Example 9, the adhesion was low since in the polymerizable composition r9, the Component B content in terms of active components was lower than 5 wt %.

In Comparative Example 10, the adhesion and the rubbing resistance were low since in the polymerizable composition r10, the Component B content in terms of active components was lower than 5 wt % and the total of the ethylene oxide group content of Component A and the Component B content in terms of active components was lower than 40 wt %.

In Comparative Example 11, the reliability was poor since in the polymerizable composition r11, the Component C content in terms of active components was higher than 10 wt %.

In Comparative Example 12, the antifouling properties and the rubbing resistance were low since the polymerizable composition r12 did not contain Component C.

In Comparative Example 13, the antifouling properties were low since the polymerizable composition r13 did not contain Component C and contained a silicone-based release agent instead.

In Comparative Examples 12 and 13, the fingerprint emergence at high humidity was determined as being reduced. However, the antifouling properties were low and the artificially contaminated liquid (supposed fingerprint) was not wiped off and spread over the entire surface of the polymer layer. Thus, regions with different refractive indexes were less likely to be generated on the surface of the polymer layer and emergence of the artificially contaminated liquid was not determined in appearance.

ADDITIONAL REMARKS

One aspect of the present invention may be an antifouling film including: a substrate; and a polymer layer disposed on a surface of the substrate and including on a surface thereof an uneven structure provided with projections at a pitch not longer than a wavelength of visible light, the polymer layer being a cured product of a polymerizable composition, the polymerizable composition containing, in terms of active components, 20 to 90 wt % of a polyfunctional acrylate containing an ethylene oxide group, 5 to 25 wt % of a monofunctional amide monomer, and 0.5 to 10 wt % of a fluorine-based release agent, the polymerizable composition containing, in terms of active components, a total of 40 to 65 wt % of the ethylene oxide group in the polyfunctional acrylate and the monofunctional amide monomer. This aspect can achieve an antifouling film that is excellent in the antifouling properties, adhesion, rubbing resistance, and reliability, and reduces fingerprint emergence at high humidity.

The polyfunctional acrylate may include a bifunctional first polyfunctional acrylate containing two to seven ethylene oxide groups per functional group and a tri- to hexa-functional second polyfunctional acrylate containing one to two ethylene oxide groups per functional group, and the polymerizable composition may contain, in terms of active components, 20 to 65 wt % of the first polyfunctional acrylate and 10 to 70 wt % of the second polyfunctional acrylate. This structure can further increase the adhesion and the rubbing resistance, and further reduce the fingerprint emergence at high humidity.

The monofunctional amide monomer may contain N,N-dimethylacrylamide. This structure can decrease the viscosity of the monofunctional amide monomer and further increase the compatibility between the polyfunctional acrylate and the fluorine-based release agent. Also, the adhesion can be increased even when the substrate is a triacetyl cellulose film.

The fluorine-based release agent may contain a perfluoropolyether group. This structure can further increase the antifouling properties and the rubbing resistance as compared with a release agent containing no perfluoropolyether group (e.g., release agent containing a perfluoroalkyl group, silicon-based release agent).

The polymer layer may have a surface that shows a contact angle of 60° or greater with hexadecane. This structure suitably increases the antifouling properties.

The polymer layer may have a thickness of 5.0 µm or greater and 20.0 µm or smaller. This structure distributes fluorine atoms in the fluorine-based release agent on the surface (the surface remote from the substrate) of the polymer layer at a high concentration.

The projections may be formed at an average pitch of 100 nm or longer and 400 nm or shorter. This structure sufficiently prevents optical phenomena such as moiré and iridescence.

The projections may have an average height of 50 nm or greater and 600 nm or smaller. This structure can simultaneously achieve the preferred average height and the preferred average aspect ratio of the projections.

The projections may have an average aspect ratio of 0.8 or greater and 1.5 or smaller. This structure can sufficiently prevent optical phenomena such as moiré and iridescence, and achieve excellent antifouling properties. Also, the structure can sufficiently prevent sticking and deterioration of the transferring conditions in formation of the uneven structure, both being due to decreased processability of the uneven structure.

REFERENCE SIGNS LIST

1: Antifouling film
2: Substrate
3: Polymer layer
4: Projection
5: Polymerizable composition
6: Die
P: Pitch
T: Thickness of polymer layer

The invention claimed is:
1. An antifouling film comprising:
a substrate; and
a polymer layer disposed on a surface of the substrate and including on a surface thereof an uneven structure provided with projections at a pitch not longer than a wavelength of visible light,
the polymer layer being a cured product of a polymerizable composition,
the polymerizable composition containing, in terms of active components, 20 to 90 wt % of a polyfunctional acrylate containing an ethylene oxide group, 5 to 25 wt % of a monofunctional amide monomer, and 0.5 to 10 wt % of a fluorine-based release agent,
the polymerizable composition containing, in terms of active components, a total of 40 to 65 wt % of the ethylene oxide group in the polyfunctional acrylate and the monofunctional amide monomer, and
the fluorine-based release agent contains a perfluoropolyether group.
2. The antifouling film according to claim 1, wherein
the polyfunctional acrylate includes a bifunctional first polyfunctional acrylate containing two to seven ethylene oxide groups per functional group and a tri- to hexa-functional second polyfunctional acrylate containing one to two ethylene oxide groups per functional group, and the polymerizable composition contains, in terms of active components, 20 to 65 wt % of the first polyfunctional acrylate and 10 to 70 wt % of the second polyfunctional acrylate.

3. The antifouling film according to claim 1, wherein the monofunctional amide monomer contains N,N-dimethylacrylamide.

4. The antifouling film according to claim 1, wherein the polymer layer has a surface that shows a contact angle of 60° or greater with hexadecane.

5. The antifouling film according to claim 1, wherein the polymer layer has a thickness of 5.0 µm or greater and 20.0 µm or smaller.

6. The antifouling film according to claim 1, wherein the projections are formed at an average pitch of 100 nm or longer and 400 nm or shorter.

7. The antifouling film according to claim 1, wherein the projections have an average height of 50 nm or greater and 600 nm or smaller.

8. The antifouling film according to claim 1, wherein the projections have an average aspect ratio of 0.8 or greater and 1.5 or smaller.

\* \* \* \* \*